United States Patent [19]
Ikari et al.

[11] 4,436,382
[45] Mar. 13, 1984

[54] RETROFOCUS TYPE SUPER WIDE ANGLE LENS SYSTEM

[75] Inventors: Kazuo Ikari, Hachiouji; Toru Fujii, Hino, both of Japan

[73] Assignee: Olympus Optical Co., Ltd., Tokyo, Japan

[21] Appl. No.: 316,915

[22] Filed: Oct. 30, 1981

[30] Foreign Application Priority Data

Nov. 4, 1980 [JP] Japan ................. 55-153790

[51] Int. Cl.³ .................. G02B 9/64; G02B 13/04
[52] U.S. Cl. ..................... 350/458; 350/439
[58] Field of Search ............ 350/458, 450, 459, 439

[56] References Cited

U.S. PATENT DOCUMENTS

| | | | |
|---|---|---|---|
| 3,981,563 | 9/1976 | Nakamura | 350/458 |
| 4,061,421 | 12/1977 | Nakagawa | 350/458 |
| 4,183,625 | 1/1980 | Tsunashima | 350/450 |

Primary Examiner—Joan K. Corbin
Assistant Examiner—Rebecca D. Gass
Attorney, Agent, or Firm—Cushman, Darby & Cushman

[57] ABSTRACT

Retro-focus type super wide angle lens system comprising a first positive meniscus lens component having the convex surface on the object side, a second negative meniscus lens component having the convex surface on the object side, a third negative meniscus lens component having the convex surface on the object side, a fourth positive lens component, a fifth negative meniscus lens component, a sixth positive cemented lens component, a seventh negative cemented lens component, an eighth positive meniscus lens component having the convex surface on the object side, a ninth positive lens component, and a filter disposed between the fifth and sixth lens components. In this lens system, aberrations are well corrected.

7 Claims, 8 Drawing Figures

RETROFOCUS TYPE SUPER WIDE ANGLE LENS SYSTEM

BACKGROUND OF THE INVENTION (a) Field of the Invention

This invention relates to a retrofocus type superwide angle lens system having a long backfocus.

(b) Description of the Prior Art

In such retrofocus type superwide angle lens system as of a superwide angle in which the field angle of view exceeds 90 degrees and a long backfocus, an image may collapse in the peripheral portion of the field of view mostly because the chromatic aberration of the magnification is large near the maximum field angle of view. Such collapse of the image because of the chromatic aberration of the magnification is different from the collapse of the image because of the coma and can not be eliminated even by a smaller stop aperture. Therefore, the deterioration of the image caused by the chromatic aberration of the magnification can not be eliminated by adjusting the stop aperture or the like and always occurs. For such reason, the chromatic aberration of the magnification must be made as small as possible. In the case of a retrofocus type superwide angle lens system, the chromatic aberration of the magnification varies extremely large with the change of the field angle of view. Therefore, usually the chromatic aberration of the magnification is undercorrected at the intermediate field angle of view but is overcorrected at the maximum field angle of view so as to keep the balance of the amounts of the chromatic aberrations of the magnifications at the respective field angles of views. However, when the field angle of view reaches even 100 degrees, if the correction is made to well balance them at the intermediate field angle of view, it will be remarkably in excess at the maximum field angle of view. In order to eliminate this defect, the difference of the chromatic aberration of the magnification by the change of the field angle of view must be made small.

Further, in such superwide angle lens system in which the field angle of view reaches 100 degrees, in case a filter is used as fitted in front of the lens system, in order that the light of the maximum field angle of view may not be cut, the filter diameter must be made so large as to be undesirable.

SUMMARY OF THE INVENTION

An object of the present invention is to provide a retrofocus type lens system which has a superwide angle in which the field angle of view exceeds 90 degrees and a long backfocus in which various aberrations and particularly the chromatic aberration of the magnification are well corrected and in which lens system a filter can be built-in.

The lens system of the present invention is of such lens arrangement as is shown in FIG. 1, that is, comprising a first positive meniscus lens component having the convex surface on the object side, a second and third negative meniscus lens components both having the convex surfaces on the object sides, a fourth positive lens component, a fifth negative meniscus lens component, a sixth positive cemented lens component, a seventh negative cemented lens component, an eighth positive meniscus lens component having the convex surface on the image side, a ninth positive lens component, and a filter F disposed between the fifth lens component and sixth lens component. The lens system of the present invention is made to satisfy the following respective conditions:

(1) $v_1 > 70$
(2) $5.5f < f_1 < 7.2f$
(3) $n_2, n_3 > 1.75$
(4) $0.65f < |f_{12345}| < 0.75f$, $f_{12345} < 0$
(5) $0.2f < d_{10} + d_{11}/N + d_{12} < 0.3f$
(6) $0.44f < D_6 < 0.55f$ wherein the reference symbol f represents a composite focal length of the entire system, the reference symbol $f_1$ represent a focal length of the first lens component, the reference symbol $f_{12345}$ represents a composite focal length from the first lens component to fifth lens component, the reference symbols $n_2$ and $n_3$ represent refractive indices respectively of the second lens component and third lens component, the reference symbol $v_1$ represents an Abbe's number of the first lens component, the reference symbol $d_{11}$ represents a thickness of the filter, the reference symbols $d_{10}$ and $d_{12}$ represent air spaces respectively between the fifth lens component and filter and between the filter and sixth lens component, the reference symbol N represents a refractive index of the filter and the reference symbol $D_6$ represents a thickness ($d_{13} + d_{14}$) of the sixth lens component.

In the lens system of such arrangement as is described above, as the field angle of view becomes larger, the chromatic aberration of the magnification occurred particularly in the first lens component will extremely become larger. Therefore, in order to reduce the difference of the chromatic aberration of the magnification by the change of the field angle of view, it is very effective to make the Abbe's number of the first lens component large. According to the present invention, as shown in the condition (1), the Abbe's number of the first lens component is made large. Out of this condition (1), the difference of the chromatic aberration of the magnification by the change of the field angle of view will become too large and therefore, if the aberrations are corrected to be well balanced at the intermediate field angle of view, the chromatic aberration of the magnification near the maximum field angle of view will become so large as to be undesirable.

Next, the larger the refracting power of the first lens component, the more effective to the correction of the distortion. However, if the refracting power of the first lens component becomes too strong, in order to retain a necessary backfocus, the refracting powers of the second lens component and third lens component must be made strong. In order to make the powers of these lenses strong, the surfaces on the image side of these lenses can not help being strongly curved and positive high order spherical aberrations will be remarkably occurred. Provided by taking this point into consideration is the condition (2). In this condition, if the focal length $f_1$ of the first lens component becomes $f_1 > 7.2f$, the refracting power will be too weak and the effect of correcting the distortion will become so weak as to be undesirable. When $f_1 < 5.5f$, the backfocus will become short. In order to keep it long, the powers of the second lens component and third lens component can not help being made strong, therefore the concave surfaces on the image side of these lenses will be strongly curved and positive high order aberrations will be occurred, will be no longer able to be corrected and will not be desirable.

If a glass material of an Abbe's number satisfying the condition (1) is selected from among glass materials available today, naturally the refractive index will become low and the Petzval sum will deteriorate. Provided to correct them is the condition (3). In this condition (3), when $n_2$ and $n_3 < 1.75$, the Petzval sum will become so small that the meridional image plane will so greatly bend to be negative in the peripheral portion that, in a smaller stop aperture, the clearness of the image in the peripheral portion will not improve.

The condition (4) defines the composite refracting power of the first lens component to fifth lens component. When $|f_{12345}| > 0.75$, no sufficient backfocus will be able to be obtained and the diameter of the first lens component will become large. When $|f_{12345}| < 0.65$, the refracting power of the negative lens component will become so strong that the positive high order spherical aberration and negative distortion will increase and will be no longer able to be corrected.

The condition (5) is to have a filter built-in. If the lower limit is exceeded, the filter will not be able to be built-in. If the upper limit is exceeded, the spherical aberration will not be corrected sufficiently.

Further, in the condition (6), when $D_6 < 0.44f$, the astigmatism and spherical aberration will not be able to be well corrected and, when $D_6 > 0.55f$, the lens system will become so large as to be undesirable.

The wide angle lens system satisfying the above explained conditions (1) to (6) is a lens system wherein the backfocus is long and various aberrations and particularly the chromatic aberration of the magnification are well corrected in the object of the present invention. However, it is more desirable to satisfy the following conditions (7) and (8)

(7) $5.5f < f_4 < 7.3f$ and (8) $\nu_2, \nu_3 > 40$ wherein the reference symbol $f_4$ represents a focal length of the fourth lens component and the reference symbols $\nu_2$ and $\nu_3$ represent Abbe's numbers respectively of the second lens component and third lens component.

The condition (7) is to make the action of correcting the distortion and the chromatic aberration of the magnification of the first lens component more effective and to prevent the refracting powers of the negative lens components (the second lens component and third lens component) from becoming so excess as to deteriorate the aberration. In this condition, if $f_4$ exceeds the upper limit, the distortion and the chromatic aberration of the magnification will be no longer able to be corrected. If $f_4$ exceeds the lower limit, the refracting powers of the second lens component and third lens component will become so strong that a positive high order spherical aberration will be occurred and will be no longer able to be corrected.

The condition (8) is to make the chromatic aberration of the magnification as small as possible. In order to reduce the chromatic aberration of the magnification, it is effective to reduce the dispersions of the second and third lens components as well as the dispersion of the first lens component is made small as defined in condition (1). If the Abbe's numbers $\nu_2$ and $\nu_3$ are out of the condition (8), the chromatic aberration of the magnification will increase to be undesirable.

As already known, in the retrofocus type superwide angle lens, when an object at a short distance is focused, the meridional image plane will greatly fluctuate. In order to correct it, various short distance correcting means have been conceived. In the lens system according to the present invention, an air space is properly taken between the second lens component and third lens component, the first lens component and second lens component are fixed and the third lens component to ninth lens component are moved as a whole so that the focusing and short distance correction for the short distance object can be simultaneously made.

DESCRIPTION OF THE PREFERRED EMBODIMENTS

Figure 1:
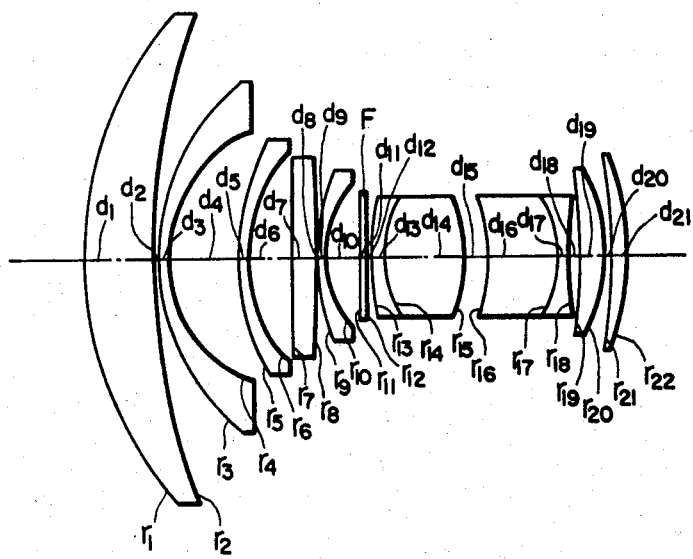
FIG. 1 is a cross-sectional view of a lens system accoridng to the present invention.
Figure 2:
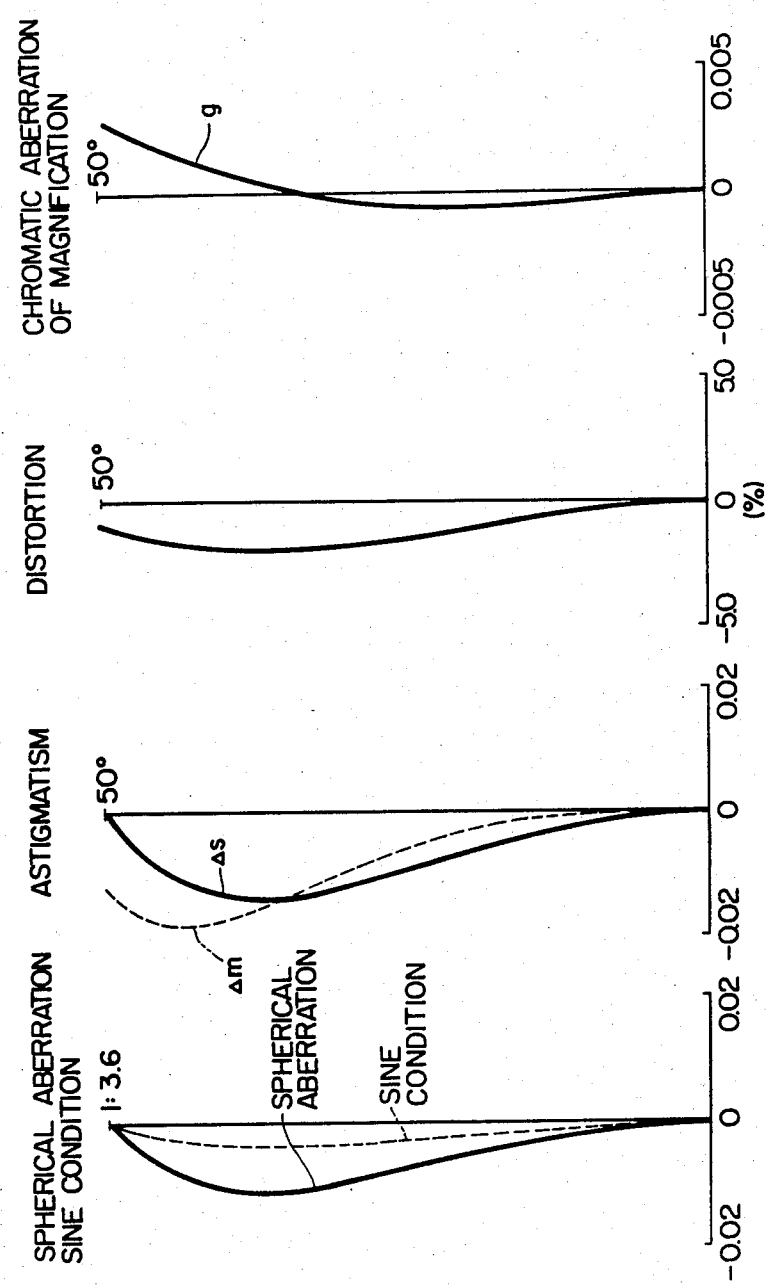
FIGS. 2 to 6 are aberration curve diagrams respectively of the first embodiment to the fifth embodiment.
Figure 3:
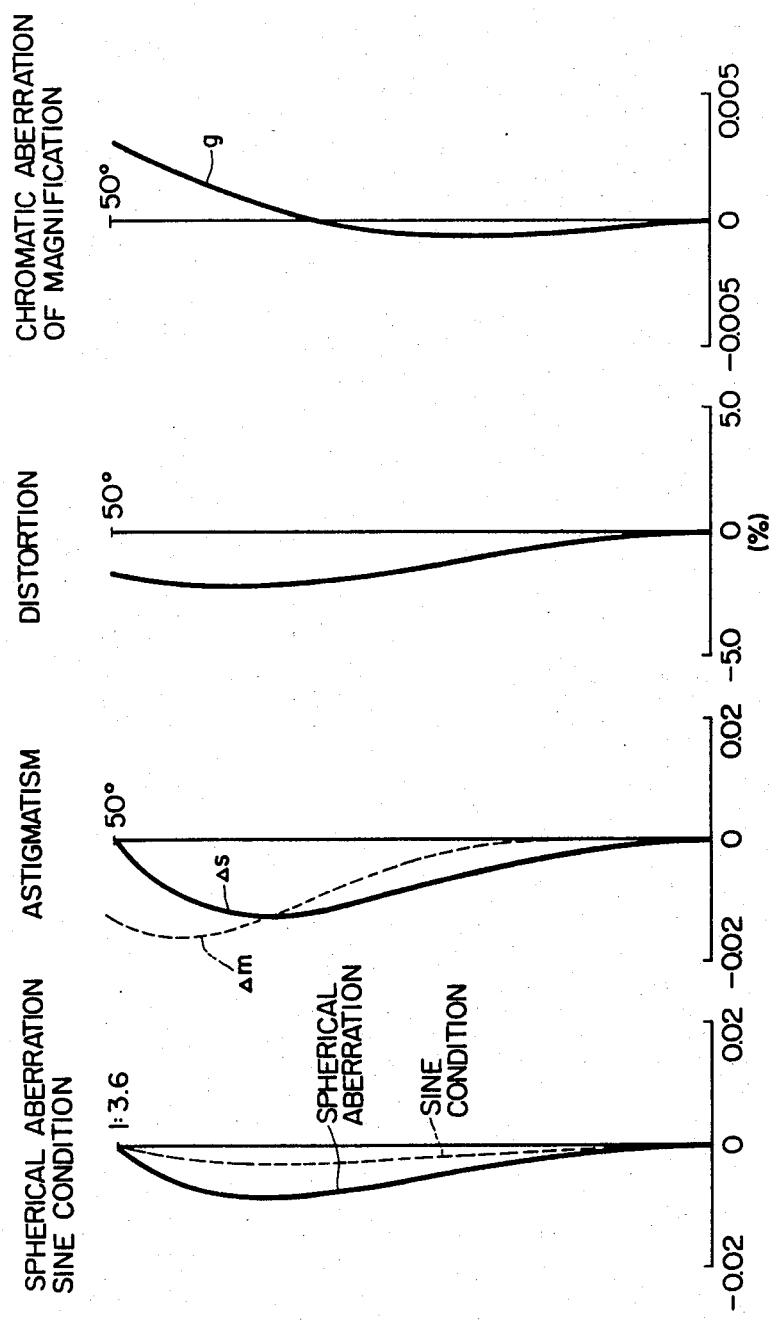
Figure 4:
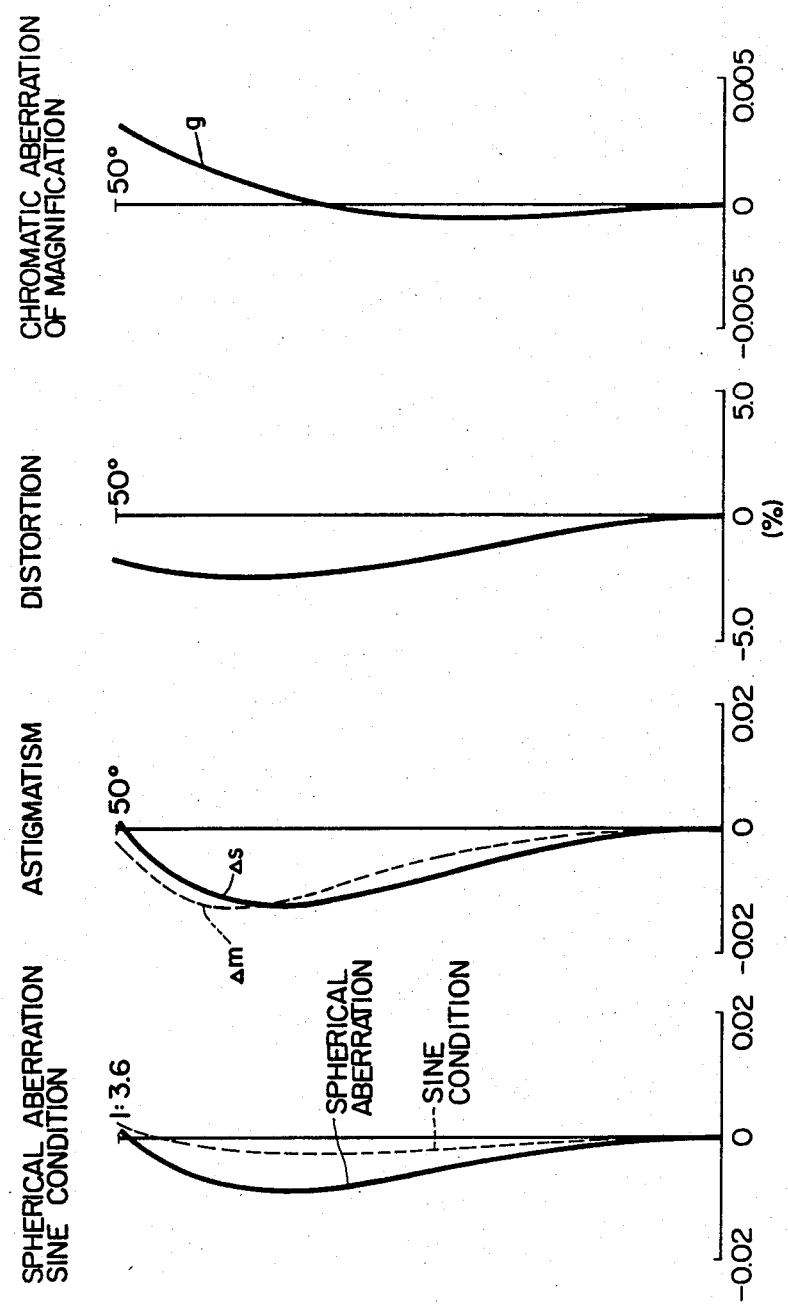
Figure 5:
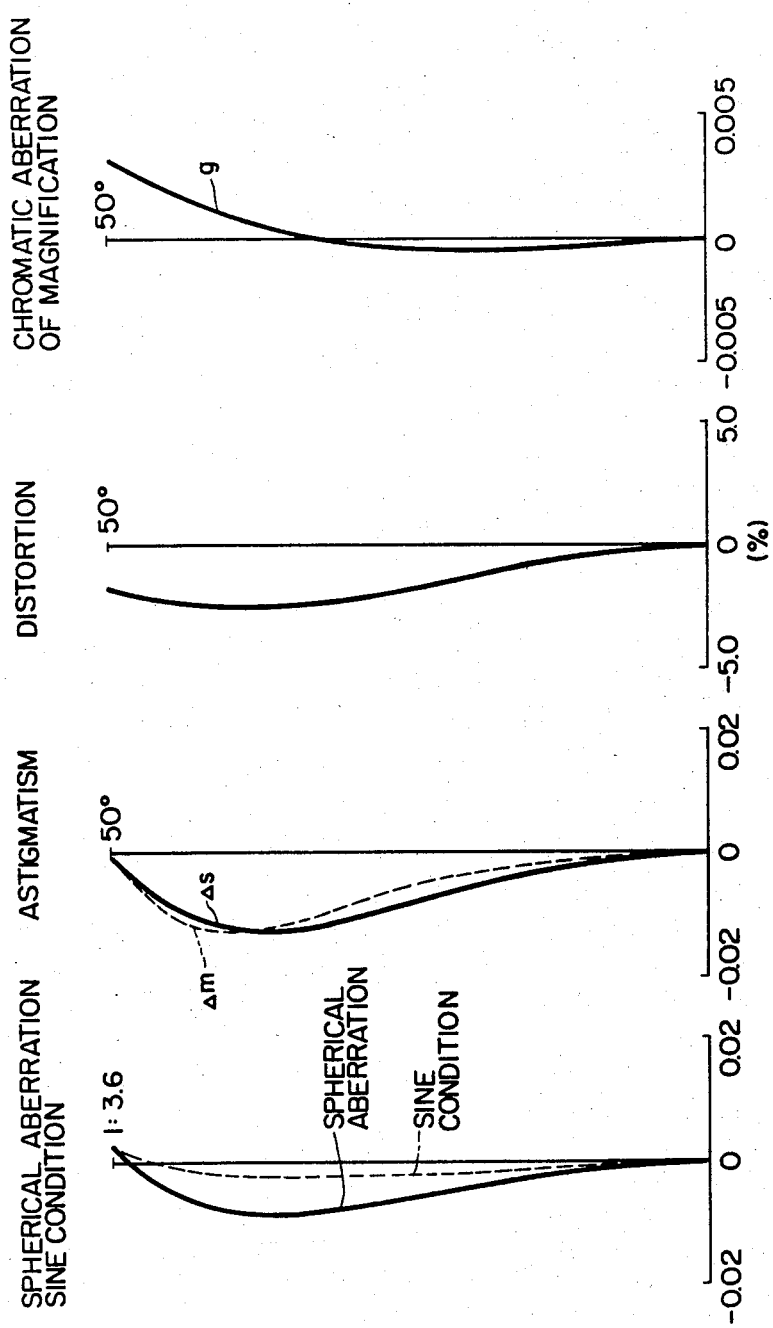
Figure 6:
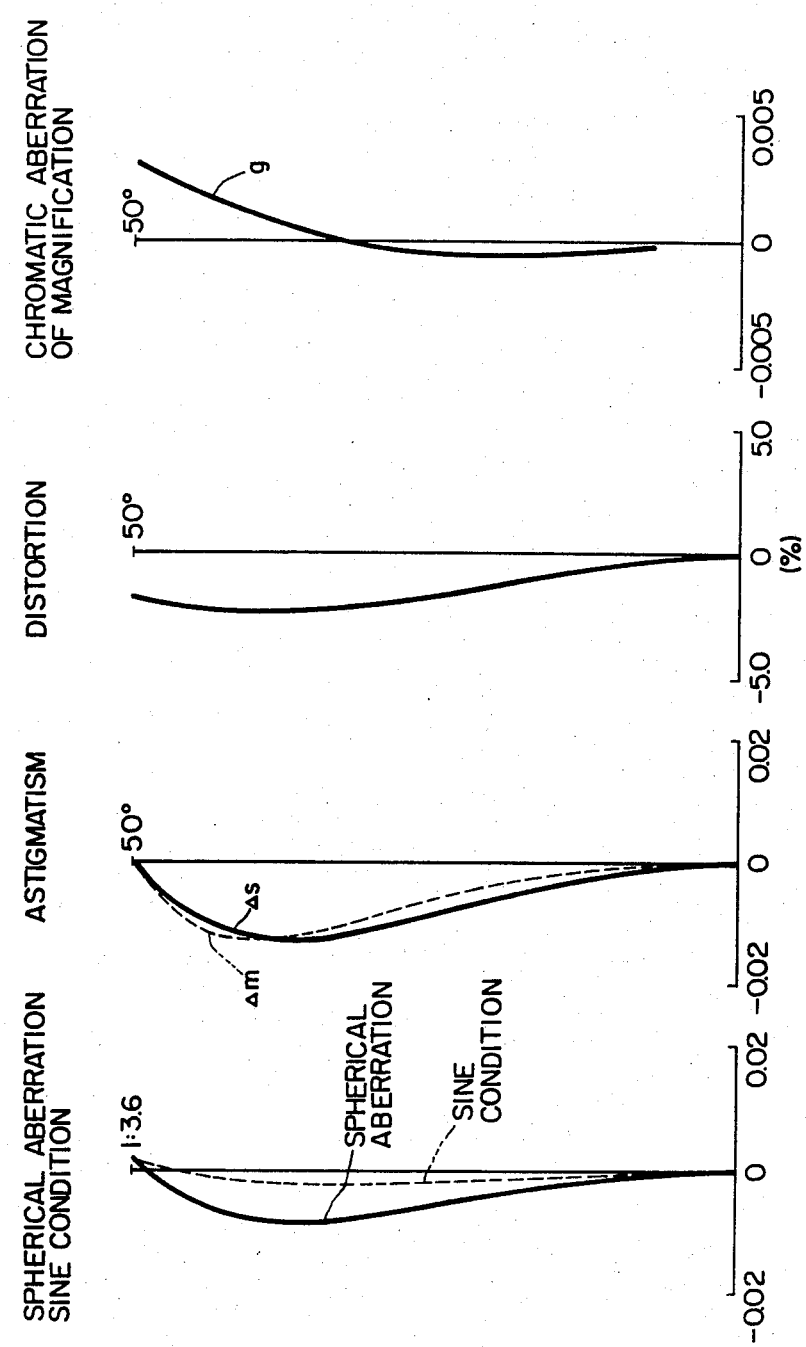

Now, numerical data will be described below as preferred embodiments and their Seidel's coefficients of the retrofocus type super-wide-angle lens system according to the present invention.

| Embodiment 1 | | | |
|---|---|---|---|
| $f = 1, F\ 3.6, 2\omega = 100°$ | | | |
| $r_1 = 2.0262$ | | | |
| | $d_1 = 0.3833$ | $n_1 = 1.48749$ | $\nu_1 = 70.15$ |
| $r_2 = 4.9948$ | | | |
| | $d_2 = 0.0048$ | | |
| $r_3 = 1.0052$ | | | |
| | $d_3 = 0.0605$ | $n_2 = 1.78800$ | $\nu_2 = 47.43$ |
| $r_4 = 0.6688$ | | | |
| | $d_4 = 0.3712$ | | |
| $r_5 = 2.7154$ | | | |
| | $d_5 = 0.0484$ | $n_3 = 1.78800$ | $\nu_3 = 47.43$ |
| | $d_6 = 0.2421$ | | |
| $r_7 = 36.3424$ | | | |
| | $d_7 = 0.1210$ | $n_4 = 1.72916$ | $\nu_4 = 54.68$ |
| $r_8 = -4.6046$ | | | |
| | $d_8 = 0.0048$ | | |
| $r_9 = 1.0454$ | | | |
| | $d_9 = 0.0484$ | $n_5 = 1.64250$ | $\nu_5 = 58.37$ |
| $r_{10} = 0.5394$ | | | |
| | $d_{10} = 0.2017$ | | |
| $r_{11} = \infty$ | | | |
| | $d_{11} = 0.0484$ | $N = 1.51633$ | $V = 64.15$ |
| $r_{12} = \infty$ | | | |
| | $d_{12} = 0.0202$ | | |
| $r_{13} = 1.1554$ | | | |
| | $d_{13} = 0.0403$ | $n_6 = 1.72000$ | $\nu_6 = 50.25$ |
| $r_{14} = 0.5717$ | | | |
| | $d_{14} = 0.4236$ | $n_7 = 1.64769$ | $\nu_7 = 33.80$ |
| $r_{15} = -1.0499$ | | | |
| | $d_{15} = 0.0807$ | | |
| $r_{16} = -2.2593$ | | | |
| | $d_{16} = 0.4236$ | $n_8 = 1.72342$ | $\nu_8 = 38.03$ |
| $r_{17} = -0.5011$ | | | |
| | $d_{17} = 0.0484$ | $n_9 = 1.80518$ | $\nu_9 = 25.43$ |
| $r_{18} = 2.4512$ | | | |
| | $d_{18} = 0.0403$ | | |
| $r_{19} = -3.2693$ | | | |
| | $d_{19} = 0.1412$ | $n_{10} = 1.56965$ | $\nu_{10} = 49.33$ |
| $r_{20} = -0.7181$ | | | |
| | $d_{20} = 0.0048$ | | |
| $r_{21} = -9.5160$ | | | |
| | $d_{21} = 0.1009$ | $n_{11} = 1.60311$ | $\nu_{11} = 60.70$ |
| $r_{22} = -1.3603$ | | | |
| $f_1 = 6.709, f_4 = 5.612, f_{12345} = -0.689$ | | | |

| | SEIDEL'S COEFFICIENTS | | | | | | |
|---|---|---|---|---|---|---|---|
| | SPHERICAL ABERRATION | ASTIGMATISM | COMA | DISTORTION | PETZVAL | AXIAL CHROMATIC ABERRATION | CHROMATIC ABERRATION OF MAGNIFICATION |
| 1 | 0.0265 | 0.0154 | 0.0202 | 0.1349 | 0.1617 | −0.0007 | −0.0005 |
| 2 | 0.0001 | 0.0399 | 0.0015 | −0.6810 | −0.0656 | 0.0001 | 0.0014 |
| 3 | 0.0733 | 0.0104 | 0.0277 | 0.1694 | 0.4384 | −0.0021 | −0.0008 |
| 4 | −0.9962 | −0.0527 | 0.2291 | 0.1637 | −0.6589 | 0.0039 | −0.0009 |
| 5 | 0.0626 | 0.1148 | 0.0848 | 0.3755 | 0.1623 | −0.0015 | −0.0020 |
| 6 | −4.9066 | −0.0099 | 0.2204 | 0.0274 | −0.5999 | 0.0062 | −0.0003 |
| 7 | 0.7357 | 0.2297 | 0.4110 | 0.1348 | 0.0116 | −0.0028 | −0.0015 |
| 8 | −0.1043 | −0.2421 | −0.1589 | −0.2294 | 0.0916 | 0.0013 | 0.0020 |
| 9 | 3.5438 | 0.0964 | 0.5844 | 0.0776 | 0.3742 | −0.0050 | −0.0008 |
| 10 | −27.0611 | −0.0069 | 0.4326 | 0.0117 | −0.7251 | 0.0099 | −0.0002 |
| 11 | 2.7007 | 0.2760 | 0.8633 | 0.0882 | 0. | −0.0037 | −0.0012 |
| 12 | −2.7808 | −0.2842 | −0.8890 | −0.0908 | 0. | 0.0038 | 0.0012 |
| 13 | 17.6006 | 0.2203 | 1.9692 | 0.0652 | 0.3623 | −0.0118 | −0.0013 |
| 14 | −4.2972 | −0.0018 | −0.0875 | −0.0009 | −0.0446 | −0.0079 | −0.0002 |
| 15 | 6.2807 | 0.4135 | −1.6116 | −0.2022 | 0.3744 | −0.0136 | 0.0035 |
| 16 | −1.4374 | −0.2628 | 0.6146 | 0.1918 | −0.1858 | 0.0073 | −0.0031 |
| 17 | −5.8005 | −0.0001 | −0.0267 | −0.002 | −0.0524 | 0.0195 | 0.0001 |
| 18 | −4.5481 | −0.8321 | −1.9453 | −0.4337 | −0.1820 | 0.0156 | 0.0067 |
| 19 | 0.1405 | 0.2886 | 0.2014 | 0.2545 | −0.1110 | −0.0017 | −0.0024 |
| 20 | 13.7811 | 0.0117 | −0.4007 | −0.0150 | 0.5054 | −0.0129 | 0.0004 |
| 21 | −0.0874 | −0.0797 | 0.0835 | 0.1138 | −0.0395 | 0.0017 | −0.0016 |
| 22 | 10.9704 | 0.0289 | −0.5629 | −0.0157 | 0.2766 | −0.0090 | 0.0005 |
| Σ | 3.8963 | −0.0267 | 0.0612 | 0.1394 | 0.0935 | −0.0033 | −0.0012 |

| Embodiment 2 | | | | |
|---|---|---|---|---|
| $f = 1, F\ 3.6, 2\omega = 100°$ | | | | |
| $r_1 = 1.8049$ | | | | |
| | $d_1 = 0.3838$ | $n_1 = 1.48749$ | $\nu_1 = 70.15$ | |
| $r_2 = 4.7677$ | | | | |
| | $d_2 = 0.0048$ | | | |
| $r_3 = 0.9694$ | | | | |
| | $d_3 = 0.0606$ | $n_2 = 1.78800$ | $\nu_2 = 47.43$ | |
| $r_4 = 0.6688$ | | | | |
| | $d_4 = 0.3717$ | | | |
| $r_5 = 2.8333$ | | | | |
| | $d_5 = 0.0485$ | $n_3 = 1.78800$ | $\nu_3 = 47.43$ | |
| $r_6 = 0.7392$ | | | | |
| | $d_6 = 0.2424$ | | | |
| $r_7 = -168.3520$ | | | | |
| | $d_7 = 0.1212$ | $n_4 = 1.72916$ | $\nu_4 = 54.68$ | |
| $r_8 = -5.0737$ | | | | |
| | $d_8 = 0.0048$ | | | |
| $r_9 = 1.0862$ | | | | |
| | $d_9 = 0.0485$ | $n_5 = 1.64250$ | $\nu_5 = 58.37$ | |
| $r_{10} = 0.5335$ | | | | |
| | $d_{10} = 0.2020$ | | | |
| $r_{11} = \infty$ | | | | |
| | $d_{11} = 0.0485$ | $N = 1.51633$ | $V = 64.15$ | |

-continued

| Embodiment 2 | | | | |
|---|---|---|---|---|
| $r_{12} = \infty$ | | | | |
| | $d_{12} = 0.0202$ | | | |
| $r_{13} = 1.1477$ | | | | |
| | $d_{13} = 0.0404$ | $n_6 = 1.72000$ | $\nu_6 = 50.25$ | |
| $r_{14} = 0.5962$ | | | | |
| | $d_{14} = 0.4444$ | $n_7 = 1.64769$ | $\nu_7 = 33.80$ | |
| $r_{15} = -1.0896$ | | | | |
| | $d_{15} = 0.0808$ | | | |
| $r_{16} = -2.1998$ | | | | |
| | $d_{16} = 0.4242$ | $n_8 = 1.72342$ | $\nu_8 = 38.03$ | |
| $r_{17} = -0.5297$ | | | | |
| | $d_{17} = 0.0485$ | $n_9 = 1.80518$ | $\nu_9 = 25.43$ | |
| $r_{18} = 2.5968$ | | | | |
| | $d_{18} = 0.0404$ | | | |
| $r_{19} = -3.0715$ | | | | |
| | $d_{19} = 0.1414$ | $n_{10} = 1.56965$ | $\nu_{10} = 49.33$ | |
| $r_{20} = -0.7457$ | | | | |
| | $d_{20} = 0.0048$ | | | |
| $r_{21} = -84.7385$ | | | | |
| | $d_{21} = 0.1010$ | $n_{11} = 1.60311$ | $\nu_{11} = 60.70$ | |
| $r_{22} = -1.3623$ | | | | |
| $f_1 = 5.715, f_4 = 7.172, f_{12345} = -0.693$ | | | | |

| | SEIDEL'S COEFFICIENTS | | | | | | |
|---|---|---|---|---|---|---|---|
| | SPHERICAL ABERRATION | ASTIGMATISM | COMA | DISTORTION | PETZVAL | AXIAL CHROMATIC ABERRATION | CHROMATIC ABERRATION OF MAGNIFICATION |
| 1 | 0.0376 | 0.0084 | 0.0178 | 0.0897 | 0.1818 | −0.0008 | −0.0004 |
| 2 | 0 | 0.0547 | 0.0010 | −0.7372 | −0.0688 | 0 | 0.0014 |
| 3 | 0.0666 | 0.0069 | 0.0215 | 0.1491 | 0.4553 | −0.0020 | −0.0007 |
| 4 | −0.8154 | −0.0513 | 0.2045 | 0.1784 | −0.6599 | 0.0037 | −0.0009 |
| 5 | 0.0343 | 0.1015 | 0.0590 | 0.4429 | 0.1558 | −0.0012 | −0.0021 |
| 6 | −3.9516 | −0.0079 | 0.1763 | 0.0270 | −0.5971 | 0.0056 | −0.0003 |
| 7 | 0.4947 | 0.2353 | 0.3412 | 0.1605 | −0.0025 | −0.0023 | −0.0016 |
| 8 | −0.1048 | −0.2433 | −0.1597 | −0.2439 | 0.0832 | 0.0013 | 0.0020 |
| 9 | 2.8572 | 0.1010 | 0.5371 | 0.0868 | 0.3607 | −0.0045 | −0.0009 |
| 10 | −24.5781 | −0.0127 | 0.5587 | 0.0170 | −0.7344 | 0.0093 | −0.0002 |
| 11 | 2.5753 | 0.2728 | 0.8382 | 0.0888 | 0 | −0.0036 | −0.0012 |
| 12 | −2.6542 | −0.2812 | −0.8639 | −0.0915 | 0 | 0.0037 | 0.0012 |
| 13 | 16.3654 | 0.2054 | 1.8332 | 0.0639 | 0.3653 | −0.0112 | −0.0013 |
| 14 | −3.4621 | −0.0017 | −0.0761 | −0.0010 | −0.0429 | −0.0071 | −0.0002 |
| 15 | 4.7032 | 0.3820 | −1.3404 | −0.2118 | 0.3613 | −0.0122 | 0.0035 |
| 16 | −1.1489 | −0.2451 | 0.5307 | 0.2015 | −0.1911 | 0.0067 | −0.0031 |
| 17 | −4.4440 | −0.0000 | 0.0026 | 0 | −0.0497 | 0.0178 | −0.0000 |
| 18 | −4.3406 | −0.8437 | −1.9137 | −0.4478 | −0.1720 | 0.0151 | 0.0067 |

SEIDEL'S COEFFICIENTS

| | SPHERICAL ABERRATION | ASTIGMATISM | COMA | DISTORTION | PETZVAL | AXIAL CHROMATIC ABERRATION | CHROMATIC ABERRATION OF MAGNIFICATION |
|---|---|---|---|---|---|---|---|
| 19 | 0.1306 | 0.2929 | 0.1956 | 0.2614 | −0.1183 | −0.0016 | −0.0024 |
| 20 | 10.4222 | 0.0164 | −0.4129 | −0.0200 | 0.4874 | −0.0119 | 0.0005 |
| 21 | −0.0063 | −0.0468 | 0.0172 | 0.1389 | −0.0044 | 0.0007 | −0.0018 |
| 22 | 10.7758 | 0.0260 | −0.5293 | −0.0149 | 0.2766 | −0.0089 | 0.0004 |
| Σ | 2.9570 | −0.0304 | 0.0386 | 0.1379 | 0.0862 | −0.0034 | −0.0012 |

Embodiment 3

$f = 1$, F 3.6, $2\omega = 100°$ $r_1 = 2.0309$
$d_1 = 0.4525$  $n_1 = 1.49700$  $\nu_1 = 81.61$
$r_2 = 4.9920$
$d_2 = 0.0048$
$r_3 = 1.0695$
$d_3 = 0.0606$  $n_2 = 1.77250$  $\nu_2 = 49.66$
$r_4 = 0.6630$
$d_4 = 0.4525$
$r_5 = 2.7516$
$d_5 = 0.0485$  $n_3 = 1.77250$  $\nu_3 = 49.66$
$r_6 = 0.7021$
$d_6 = 0.2141$
$r_7 = \infty$
$d_7 = 0.0929$  $n_4 = 1.69350$  $\nu_4 = 53.23$
$r_8 = -4.5998$
$d_8 = 0.0048$
$r_9 = 1.0733$
$d_9 = 0.0485$  $n_5 = 1.65830$  $\nu_5 = 57.33$
$r_{10} = 0.5960$
$d_{10} = 0.1616$
$r_{11} = \infty$
$d_{11} = 0.0485$  $N = 1.51633$  $V = 64.15$
$r_{12} = \infty$
$d_{12} = 0.0202$
$r_{13} = 1.0994$
$d_{13} = 0.0404$  $n_6 = 1.71300$  $\nu_6 = 53.84$
$r_{14} = 0.5779$
$d_{14} = 0.4242$  $n_7 = 1.64769$  $\nu_7 = 33.80$
$r_{15} = -1.1319$
$d_{15} = 0.0808$
$r_{16} = -2.1313$
$d_{16} = 0.4242$  $n_8 = 1.72342$  $\nu_8 = 38.03$
$r_{17} = -0.5036$
$d_{17} = 0.0485$  $n_9 = 1.80518$  $\nu_9 = 25.43$

-continued
Embodiment 3

$r_{18} = 2.7547$
$d_{18} = 0.0404$
$r_{19} = -3.1194$
$d_{19} = 0.1414$  $n_{10} = 1.61484$  $\nu_{10} = 51.17$
$r_{20} = -0.7700$
$d_{20} = 0.0048$
$r_{21} = -20.0205$
$d_{21} = 0.1091$  $n_{11} = 1.60738$  $\nu_{11} = 56.81$
$r_{22} = -1.3601$ $f_1 = 6.557$, $f_4 = 6.633$, $f_{12345} = -0.675$

SEIDEL'S COEFFICIENTS

| | SPHERICAL ABERRATION | ASTIGMATISM | COMA | DISTORTION | PETZVAL | AXIAL CHROMATIC ABERRATION | CHROMATIC ABERRATION OF MAGNIFICATION |
|---|---|---|---|---|---|---|---|
| 1 | 0.0265 | 0.0124 | 0.0181 | 0.1202 | 0.1635 | −0.0006 | −0.0004 |
| 2 | 0 | 0.0439 | 0.0014 | −0.7168 | −0.0665 | 0 | 0.0012 |
| 3 | 0.0511 | 0.0128 | 0.0256 | 0.2106 | 0.4075 | −0.0017 | −0.0009 |
| 4 | −1.0852 | −0.0779 | 0.2907 | 0.1970 | −0.6574 | 0.0038 | −0.0010 |
| 5 | 0.0836 | 0.1274 | 0.1032 | 0.3528 | 0.1584 | −0.0016 | −0.0019 |
| 6 | −6.4033 | −0.0077 | 0.2217 | 0.0218 | −0.6208 | 0.0065 | −0.0002 |
| 7 | 0.8979 | 0.2436 | 0.4677 | 0.1269 | 0 | −0.0030 | −0.0015 |
| 8 | −0.2024 | −0.2630 | −0.2307 | −0.1983 | 0.0890 | 0.0017 | 0.0019 |
| 9 | 4.4181 | 0.1050 | 0.6811 | 0.0732 | 0.3698 | −0.0055 | −0.0008 |
| 10 | −24.7042 | −0.0005 | −0.1089 | −0.0009 | −0.6661 | 0.0098 | 0 |
| 11 | 2.7921 | 0.2793 | 0.8832 | 0.0883 | 0 | −0.0037 | −0.0012 |
| 12 | −2.8789 | −0.2880 | −0.9105 | −0.0911 | 0 | 0.0038 | 0.0012 |
| 13 | 18.3341 | 0.2099 | 1.9619 | 0.0630 | 0.3786 | −0.0111 | −0.0012 |
| 14 | −3.4723 | −0.0017 | −0.0775 | −0.0009 | −0.0400 | −0.0088 | −0.0002 |
| 15 | 4.1829 | 0.3652 | −1.2359 | −0.2105 | 0.3473 | −0.0118 | 0.0035 |
| 16 | −1.1536 | −0.2412 | 0.5275 | 0.2003 | −0.1969 | 0.0068 | −0.0031 |
| 17 | −5.2201 | −0.0001 | −1.1233 | −0.0002 | −0.0522 | 0.0189 | 0.0001 |
| 18 | −4.3854 | −0.8434 | −1.9232 | −0.4409 | −0.1619 | 0.0152 | 0.0067 |
| 19 | 0.1654 | 0.3176 | 0.2292 | 0.2709 | −0.1221 | −0.0018 | −0.0024 |
| 20 | 10.5598 | 0.0190 | −0.4474 | −0.0218 | 0.4945 | −0.0120 | 0.0005 |
| 21 | −0.0218 | −0.0590 | 0.0359 | 0.1282 | −0.0189 | 0.0011 | −0.0018 |
| 22 | 11.0516 | 0.0248 | −0.5236 | −0.0143 | 0.2778 | −0.0096 | 0.0005 |
| Σ | 3.0357 | −0.0216 | −0.0340 | 0.1555 | 0.0837 | −0.0033 | −0.0012 |

Embodiment 4

$f = 1$, F 3.6, $2\omega = 100°$ $r_1 = 2.0440$
$d_1 = 0.4525$  $n_1 = 1.49700$  $\nu_1 = 81.61$
$r_2 = 4.9265$
$d_2 = 0.0048$
$r_3 = 1.0532$
$d_3 = 0.0606$  $n_2 = 1.77250$  $\nu_2 = 49.66$
$r_4 = 0.6741$
$d_4 = 0.4525$
$r_5 = 2.5695$
$d_5 = 0.0485$  $n_3 = 1.77250$  $\nu_3 = 49.66$
$r_6 = 0.7388$
$d_6 = 0.2141$
$r_7 = -63.9498$
$d_7 = 0.0929$  $n_4 = 1.69350$  $\nu_4 = 53.23$
$r_8 = -4.5088$
$d_8 = 0.0048$
$r_9 = 1.0581$
$d_9 = 0.0485$  $n_5 = 1.65830$  $\nu_5 = 57.44$
$r_{10} = 0.5869$ 4,436,382

-continued

Embodiment 4

| | | | |
|---|---|---|---|
| $r_{11} = \infty$ | $d_{10} = 0.2303$ | | |
| | $d_{11} = 0.0485$ | $N = 1.51633$ | $V = 64.15$ |
| $r_{12} = \infty$ | $d_{12} = 0.0202$ | | |
| $r_{13} = 1.2239$ | $d_{13} = 0.0404$ | $n_6 = 1.71300$ | $\nu_6 = 53.84$ |
| $r_{14} = 0.5775$ | $d_{14} = 0.4242$ | $n_7 = 1.64769$ | $\nu_7 = 33.80$ |
| $r_{15} = -1.1416$ | $d_{15} = 0.0808$ | | |
| $r_{16} = -2.1317$ | $d_{16} = 0.4242$ | $n_8 = 1.72342$ | $\nu_8 = 38.03$ |
| $r_{17} = -0.5082$ | $d_{17} = 0.0485$ | $n_9 = 1.80518$ | $\nu_9 = 25.43$ |
| $r_{18} = 2.8444$ | $d_{18} = 0.0404$ | | |
| $r_{19} = -2.8049$ | $d_{19} = 0.1414$ | $n_{10} = 1.61484$ | $\nu_{10} = 51.17$ |
| $r_{20} = -0.7913$ | $d_{20} = 0.0048$ | | |
| $r_{21} = -48.2415$ | $d_{21} = 0.1091$ | $n_{11} = 1.60738$ | $\nu_{11} = 56.81$ |
| $r_{22} = -1.3529$ | | | |

$f_1 = 6.681$, $f_4 = 6.990$ $f_{12345} = -0.727$

Embodiment 5

| | | | |
|---|---|---|---|
| | $d_4 = 0.4525$ | | |
| $r_5 = 2.6585$ | $d_5 = 0.0485$ | $n_3 = 1.77250$ | $\nu_3 = 49.66$ |
| $r_6 = 0.7222$ | $d_6 = 0.2141$ | | |
| $r_7 = -135.7023$ | $d_7 = 0.0929$ | $n_4 = 1.69350$ | $\nu_4 = 53.23$ |
| $r_8 = -4.2585$ | $d_8 = 0.0048$ | | |
| $r_9 = 1.0891$ | $d_9 = 0.0485$ | $n_5 = 1.65830$ | $\nu_5 = 57.33$ |
| $r_{10} = 0.5965$ | $d_{10} = 0.1616$ | | |
| $r_{11} = \infty$ | $d_{11} = 0.0485$ | $N = 1.51633$ | $V = 64.15$ |
| $r_{12} = \infty$ | $d_{12} = 0.0202$ | | |
| $r_{13} = 1.1589$ | $d_{13} = 0.0404$ | $n_6 = 1.71300$ | $\nu_6 = 53.84$ |
| $r_{14} = 0.5855$ | $d_{14} = 0.4768$ | $n_7 = 1.64769$ | $\nu_7 = 33.80$ |
| $r_{15} = -1.1048$ | $d_{15} = 0.0808$ | | |
| $r_{16} = -2.1218$ | $d_{16} = 0.4242$ | $n_8 = 1.72342$ | $\nu_8 = 38.03$ |
| $r_{17} = -0.5189$ | $d_{17} = 0.0485$ | $n_9 = 1.80518$ | $\nu_9 = 25.43$ |

SEIDEL'S COEFFICIENTS

| | SPHERICAL ABERRATION | ASTIGMATISM | COMA | DISTORTION | PETZVAL | AXIAL CHROMATIC ABERRATION | CHROMATIC ABERRATION OF MAGNIFICATION |
|---|---|---|---|---|---|---|---|
| 1 | 0.0260 | 0.0109 | 0.0168 | 0.1121 | 0.1624 | −0.0006 | −0.0004 |
| 2 | 0.0001 | 0.0411 | 0.0015 | −9.7104 | −0.0674 | 0 | 0.0012 |
| 3 | 0.0562 | 0.0097 | 0.0234 | 0.1761 | 0.4138 | −0.0018 | −0.0007 |
| 4 | −0.9752 | −0.0857 | 0.2891 | 0.2171 | −0.6466 | 0.0036 | −0.0011 |
| 5 | 0.0778 | 0.1156 | 0.0948 | 0.3477 | 0.1696 | −0.0015 | −0.0019 |
| 6 | −4.8763 | −0.0069 | 0.1839 | 0.0225 | −0.5899 | 0.0059 | −0.0002 |
| 7 | 0.5974 | 0.2303 | 0.3709 | 0.1390 | −0.0064 | −0.0025 | −0.0016 |
| 8 | −0.1219 | −0.2443 | −0.1725 | −0.2173 | 0.0908 | 0.0014 | 0.0020 |
| 9 | 3.5098 | 0.0861 | 0.5497 | 0.0722 | 0.3752 | −0.0050 | −0.0008 |
| 10 | −20.8199 | −0.0027 | 0.2355 | 0.0077 | −0.6764 | 0.0091 | −0.0001 |
| 11 | 2.2846 | 0.2705 | 0.7862 | 0.0931 | 0 | −0.0035 | −0.0012 |
| 12 | −2.3491 | −0.2783 | −0.8084 | −0.0957 | 0 | 0.0036 | 0.0012 |
| 13 | 14.6472 | 0.2266 | 1.8220 | 0.0705 | 0.3401 | −0.0104 | −0.0013 |
| 14 | −3.6613 | −0.0017 | −0.0793 | −0.0009 | −0.0401 | −0.0091 | −0.0002 |
| 15 | 4.4559 | 0.3683 | −0.2810 | −0.2049 | 0.3443 | −0.0121 | 0.0035 |
| 16 | −1.2671 | −0.2457 | 0.5579 | 0.1949 | −0.1969 | 0.0071 | −0.0031 |
| 17 | −5.3533 | −0.0001 | −0.0186 | −0.002 | −0.0517 | 0.0192 | 0.0001 |
| 18 | −4.1604 | −0.8030 | −1.8278 | −0.4217 | −0.1568 | 0.0150 | 0.0066 |
| 19 | 0.0951 | 0.2831 | 0.1641 | 0.2542 | −0.1357 | −0.0014 | −0.0024 |
| 20 | 9.4120 | 0.0236 | −0.4716 | −0.0253 | 0.4812 | −0.0117 | 0.0006 |
| 21 | −0.0059 | −0.0426 | 0.0159 | 0.1354 | −0.0078 | 0.0007 | −0.0019 |
| 22 | 11.4693 | 0.0251 | −0.5361 | −0.0142 | 0.2793 | −0.0098 | 0.0005 |
| Σ | 3.0408 | −0.0199 | −0.0838 | 0.1518 | 0.0810 | −0.0037 | −0.0013 |

Embodiment 5

$f = 1$, $F\ 3.6$, $2\omega = 100°$

| | | | |
|---|---|---|---|
| $r_1 = 2.1468$ | $d_1 = 0.4525$ | $n_1 = 1.49700$ | $\nu_1 = 81.61$ |
| $r_2 = 5.2116$ | $d_2 = 0.0048$ | | |
| $r_3 = 1.1169$ | $d_3 = 0.0606$ | $n_2 = 1.77250$ | $\nu_2 = 49.66$ |
| $r_4 = 0.6812$ | | | |
| $r_{18} = 2.9188$ | $d_{18} = 0.0404$ | | |
| $r_{19} = -2.8584$ | $d_{19} = 0.1414$ | $n_{10} = 1.61484$ | $\nu_{10} = 51.17$ |
| $r_{20} = -0.7817$ | $d_{20} = 0.0048$ | | |
| $r_{21} = -18.9947$ | $d_{21} = 0.1091$ | $n_{11} = 1.60738$ | $\nu_{11} = 56.81$ |
| $r_{22} = -1.3529$ | | | |

$f_1 = 7.002$, $f_4 = 6.338$, $f_{12345} = -0.683$

SEIDEL'S COEFFICIENTS

| | SPHERICAL ABERRATION | ASTIGMATISM | COMA | DISTORTION | PETZVAL | AXIAL CHROMATIC ABERRATION | CHROMATIC ABERRATION OF MAGNIFICATION |
|---|---|---|---|---|---|---|---|
| 1 | 0.0224 | 0.0145 | 0.0181 | 0.1363 | 0.1546 | −0.0006 | −0.0005 |
| 2 | 0 | 0.0397 | 0.0014 | −0.7007 | −0.0637 | 0 | 0.0012 |
| 3 | 0.0473 | 0.0144 | 0.0261 | 0.2228 | 0.3902 | −0.0017 | −0.0009 |

-continued

SEIDEL'S COEFFICIENTS

| | SPHERICAL ABERRATION | ASTIGMATISM | COMA | DISTORTION | PETZVAL | AXIAL CHROMATIC ABERRATION | CHROMATIC ABERRATION OF MAGNIFICATION |
|---|---|---|---|---|---|---|---|
| 4 | −1.0752 | −0.0731 | 0.2803 | 0.1858 | −0.6398 | 0.0037 | −0.0010 |
| 5 | 0.0985 | 0.1256 | 0.1113 | 0.3269 | 0.1639 | −0.0017 | −0.0019 |
| 6 | −6.1470 | −0.0083 | 0.2257 | 0.0225 | −0.6035 | 0.0065 | −0.0002 |
| 7 | 0.8387 | 0.2353 | 0.4442 | 0.1230 | −0.0030 | −0.0029 | −0.0015 |
| 8 | −0.1595 | −0.2541 | −0.2013 | −0.1994 | 0.0962 | 0.0016 | 0.0020 |
| 9 | 4.1618 | 0.0958 | 0.6316 | 0.0699 | 0.3645 | −0.0054 | −0.0008 |
| 10 | −24.5769 | −0.0005 | 0.1061 | 0.0029 | −0.6655 | 0.0098 | −0.0000 |
| 11 | 2.7097 | 0.2626 | 0.8436 | 0.0818 | 0 | −0.0037 | −0.0011 |
| 12 | −2.7928 | −0.2707 | −0.8695 | −0.0843 | 0 | 0.0038 | 0.0012 |
| 13 | 16.9114 | 0.1844 | 1.7660 | 0.0568 | 0.3592 | −0.0107 | −0.0011 |
| 14 | −3.4692 | −0.0006 | −0.0470 | −0.0005 | −0.0395 | −0.0088 | −0.0001 |
| 15 | 4.7829 | 0.3721 | −1.3340 | −0.2030 | 0.3558 | −0.0125 | 0.0035 |
| 16 | −1.2640 | −0.2426 | 0.5538 | 0.1930 | −0.1978 | 0.0071 | −0.0031 |
| 17 | −5.1146 | −0.0000 | −0.0074 | −0.0001 | −0.0507 | 0.0190 | 0 |
| 18 | −4.1235 | −0.7907 | −1.8057 | −0.4132 | −0.1528 | 0.0150 | 0.0066 |
| 19 | 0.1014 | 0.2834 | 0.1695 | 0.2510 | −0.1332 | −0.0014 | −0.0024 |
| 20 | 10.5257 | 0.0214 | −0.4743 | −0.0229 | 0.4871 | −0.0122 | 0.0005 |
| 21 | −0.0195 | −0.0550 | 0.0328 | 0.1257 | −0.0199 | 0.0011 | −0.0019 |
| 22 | 11.6641 | 0.0253 | −0.5433 | −0.0142 | 0.2793 | −0.0099 | 0.0005 |
| Σ | 3.1217 | −0.0211 | −0.0722 | 0.1601 | 0.0814 | −0.0037 | −0.0012 | wherein the reference symbols $r_1$ through $r_{22}$ represent radii of curvature on the surfaces of the respective lens components (and the filter), the reference symbols $d_1$ through $d_{21}$ represent thicknesses of the respective lens components (and the filter) and airspaces therebetween, the reference symbols $n_1$ through $n_{11}$ represent refractive indices of the respective lens components, the reference symbol N represents refractive index of the filter, the reference symbols $v_1$ through $v_{11}$ represent Abbe's numbers of the respective lens components, the reference symbol V represents Abbe's number of the filter, and the reference symbol $\omega$ represents half angle of view.

Figure 7:
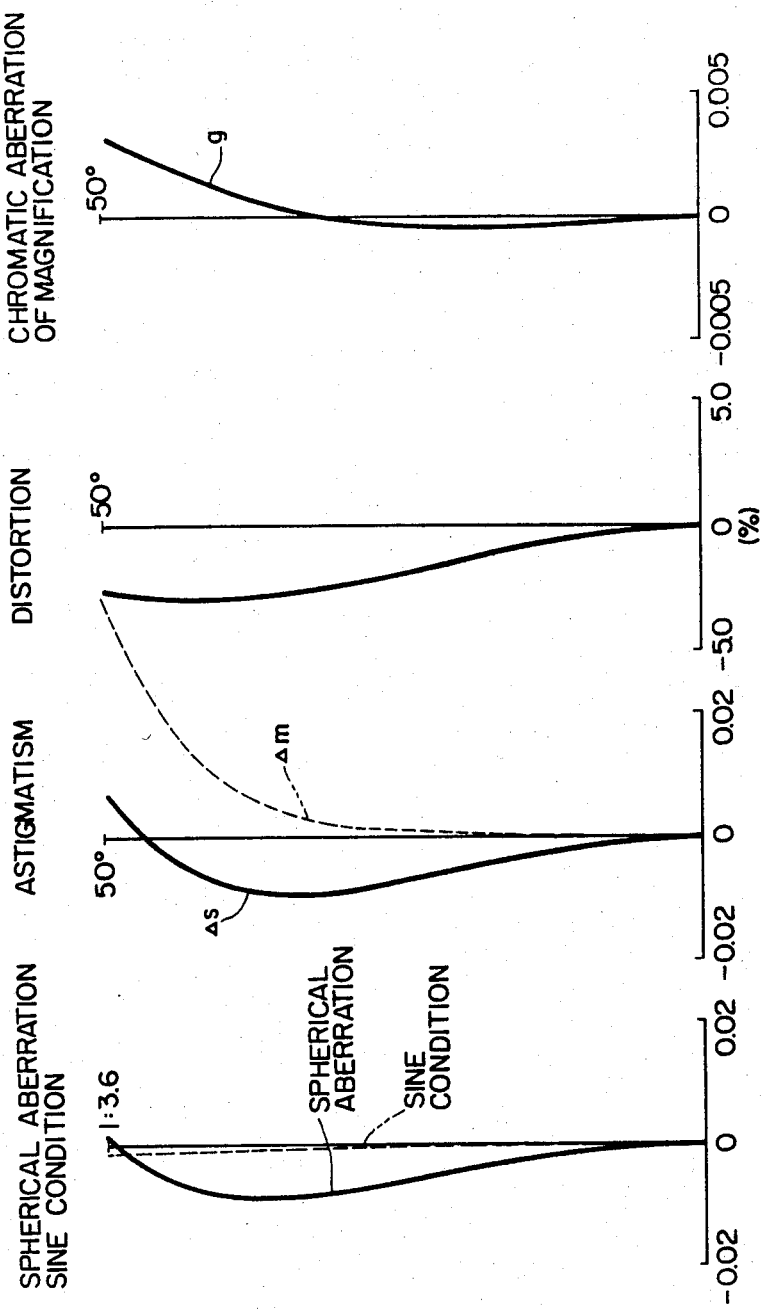
FIG. 7 is an aberration curve diagram when an object at a short distance is focused by paying out the entire lens system in the third embodiment of the present invention.
Figure 8:
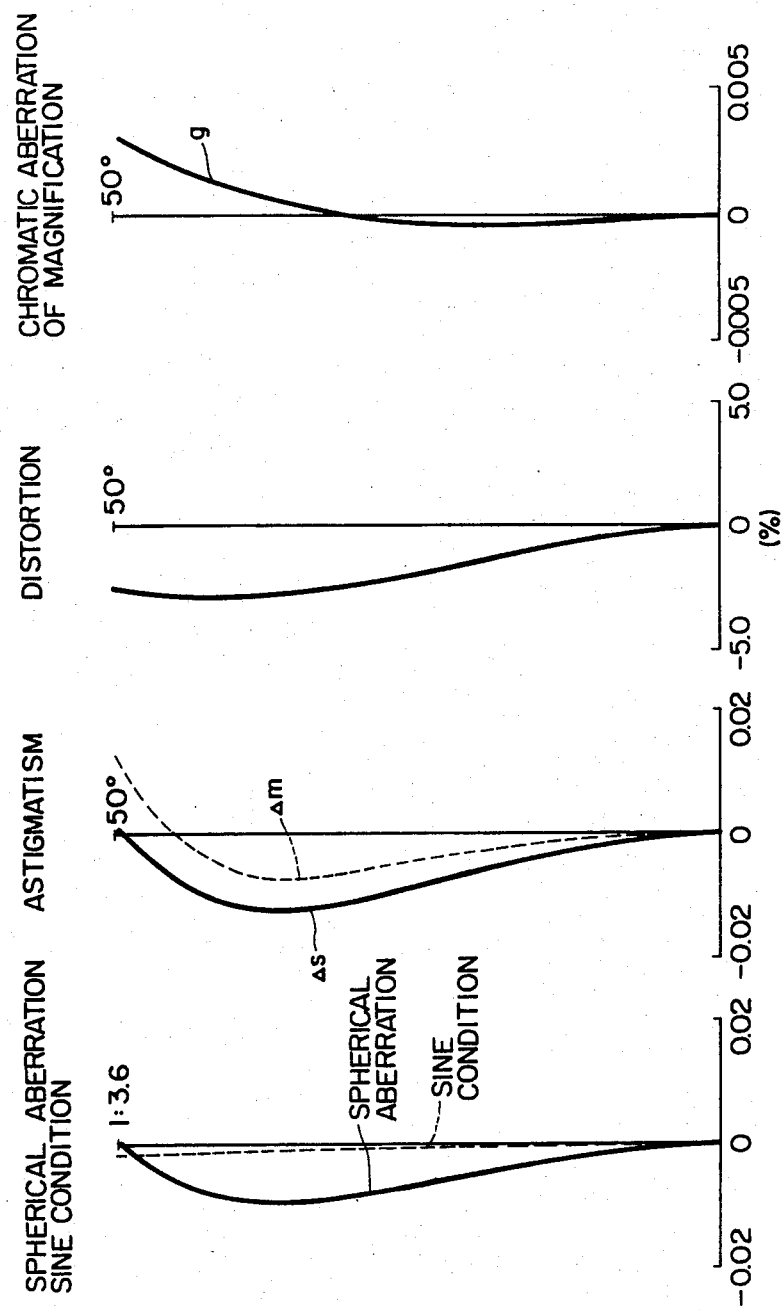
FIG. 8 is an aberration curve diagram when an object at a short distance is focused by paying out the third lens component to eleventh lens component together in the third embodiment of the present invention.

The aberrations of the above mentioned respective embodiments are as shown respectively in FIGS. 2 to 6. Various aberrations including the chromatic aberration of the magnification are well corrected. FIG. 7 is an aberration curve diagram when an object at a short distance is focused (to a magnification of 50 times as large) by paying out the entire lens system in the third embodiment and FIG. 8 is an aberration curve diagram when an object at a short distance is focused (to a magnification of 50 times as large) by paying out the third lens component to ninth lens component together in the third embodiment. In this case, the air space between the second lens component and third lens component is 0.431. As evident from these diagrams, by the method of paying out the third lens component to ninth lens component together, the bend of the astigmatism (particularly meridional image plane) is corrected.

We claim:

1. A retrofocus type superwide angle lens system comprising a first positive meniscus lens component having the convex surface on the object side, a second negative meniscus lens component having the convex surface on the object side, a third negative meniscus lens component having the convex surface on the object side, a fourth positive lens component, a fifth negative meniscus lens component, a sixth positive cemented lens component, a seventh negative cemented lens component, an eighth positive meniscus lens component having the convex surface on the object side, a ninth positive lens component and a filter disposed between said fifth and sixth lens components, said lens system satisfying the following respective conditions:

(1) $v_1 > 70$
(2) $5.5f < f_1 < 7.2f$
(3) $n_2, n_3 > 1.75$
(4) $0.65f < |f_{12345}| < 0.75f$, $f_{12345} < 0$
(5) $0.2f < d_{10} + d_{11}/N + d_{12} < 0.3f$
(6) $0.44f < D_6 < 0.55f$ wherein the reference symbol f represents a composite focal length of the entire system, the reference symbol $f_1$ represents a focal length of the first lens component, the reference symbol $f_{12345}$ represents a composite focal length from the first lens component to fifth lens component, the reference symbols $n_2$ and $n_3$ represent refractive indices respectively of the second lens component and third lens component, the reference symbol $v_1$ represents an Abbe's number of the first lens component, the reference symbol $d_{11}$ represents a thickness of the filter, the reference symbols $d_{10}$ and $d_{12}$ represent air spaces respectively between the fifth lens component and filter and between the filter and sixth lens component, the reference symbol N represents a refractive index of the filter, and the reference symbol $D_6$ represents a thickness of the sixth lens component.

2. A retrofocus type superwide angle lens system according to claim 1 further satisfying the following conditions:

(7) $5.5f < f_4 < 7.3f$
(8) $v_2, v_3 > 40$ wherein the reference symbol $f_4$ represents a focal length of said fourth lens component, and the reference symbols $v_2$ and $v_3$ represent respectively Abbe's numbers of said second and third lens components.

3. A retrofocus type superwide angle lens system according to claim 1 or 2 having the following numerical data:

| f = 1, | F 3.6, | 2ω = 100° |
|---|---|---|
| $r_1 = 2.0262$ | | |
| $d_1 = 0.3833$ | $n_1 = 1.48749$ | $v_1 = 70.15$ |
| $r_2 = 4.9948$ | | |
| $d_2 = 0.0048$ | | |
| $r_3 = 1.0052$ | | |
| $d_3 = 0.0605$ | $n_2 = 1.78800$ | $v_2 = 47.43$ |
| $r_4 = 0.6688$ | | |
| $d_4 = 0.3712$ | | |
| $r_5 = 2.7154$ | | |
| $d_5 = 0.0484$ | $n_3 = 1.78800$ | $v_3 = 47.43$ |

-continued

| | | |
|---|---|---|
| $r_6 = 0.7346$ | | |
| $d_6 = 0.2421$ | | |
| $r_7 = 36.3424$ | | |
| $d_7 = 0.1210$ | $n_4 = 1.72916$ | $\nu_4 = 54.68$ |
| $r_8 = -4.6046$ | | |
| $d_8 = 0.0048$ | | |
| $r_9 = 1.0454$ | | |
| $d_9 = 0.0484$ | $n_5 = 1.64250$ | $\nu_5 = 58.37$ |
| $r_{10} = 0.5394$ | | |
| $d_{10} = 0.2017$ | | |
| $r_{11} = \infty$ | | |
| $d_{11} = 0.0484$ | $N = 1.51633$ | $V = 64.15$ |
| $r_{12} = \infty$ | | |
| $d_{12} = 0.0202$ | | |
| $r_{13} = 1.1554$ | | |
| $d_{13} = 0.0403$ | $n_6 = 1.72000$ | $\nu_6 = 50.25$ |
| $r_{14} = 0.5717$ | | |
| $d_{14} = 0.4236$ | $n_7 = 1.64769$ | $\nu_7 = 33.80$ |
| $r_{15} = -1.0499$ | | |
| $d_{15} = 0.0807$ | | |
| $r_{16} = -2.2593$ | | |
| $d_{16} = 0.4236$ | $n_8 = 1.72342$ | $\nu_8 = 38.03$ |
| $r_{17} = -0.5011$ | | |
| $d_{17} = 0.0484$ | $n_9 = 1.80518$ | $\nu_9 = 25.43$ |
| $r_{18} = 2.4512$ | | |
| $d_{18} = 0.0403$ | | |
| $r_{19} = -3.2693$ | | |
| $d_{19} = 0.1412$ | $n_{10} = 1.56965$ | $\nu_{10} = 49.33$ |
| $r_{20} = -0.7181$ | | |
| $d_{20} = 0.0048$ | | |
| $r_{21} = -9.5160$ | | |
| $d_{21} = 0.1009$ | $n_{11} = 1.60311$ | $\nu_{11} = 60.70$ |
| $r_{22} = -1.3603$ | | |
| $f_1 = 6.709,$ | $f_4 = 5.612,$ | $f_{12345} = -0.689$ | wherein the reference symbols $r_1$ through $r_{22}$ represent radii of curvature on the surfaces of the respective lens components (and the filter), the reference symbols $d_1$ through $d_{21}$ represent thicknesses of the respective lens components (and the filter) and airspaces therebetween, the reference symbols $n_1$ through $n_{11}$ represent refractive indices of the respective lens components, the reference symbol N represents a refractive index of the filter, the reference symbols $\nu_1$ through $\nu_{11}$ represent Abbe's numbers of the respective lens components, the reference symbol V represents an Abbe's number of the filter, and the reference symbol $\omega$ represents a half field angle of view.

4. A retrofocus type superwide angle lens system according to claim 1 or 2 having the following numerical data:

| $f = 1,$ | F 3.6, | $2\omega = 100°$ |
|---|---|---|
| $r_1 = 1.8049$ | | |
| $d_1 = 0.3838$ | $n_1 = 1.48749$ | $\nu_1 = 70.15$ |
| $r_2 = 4.7677$ | | |
| $d_2 = 0.0048$ | | |
| $r_3 = 0.9694$ | | |
| $d_3 = 0.0606$ | $n_2 = 1.78800$ | $\nu_1 = 47.43$ |
| $r_4 = 0.6688$ | | |
| $d_4 = 0.3717$ | | |
| $r_5 = 2.8333$ | | |
| $d_5 = 0.0485$ | $n_3 = 1.78800$ | $\nu_3 = 47.43$ |
| $r_6 = 0.7392$ | | |
| $d_6 = 0.2424$ | | |
| $r_7 = -168.3520$ | | |
| $d_7 = 0.1212$ | $n_4 = 1.72916$ | $\nu_4 = 54.68$ |
| $r_8 = -5.0737$ | | |
| $d_8 = 0.0048$ | | |
| $r_9 = 1.0862$ | | |
| $d_9 = 0.0485$ | $n_5 = 1.64250$ | $\nu_5 = 58.37$ |
| $r_{10} = 0.5335$ | | |
| $d_{10} = 0.2020$ | | |
| $r_{11} = \infty$ | | |
| $d_{11} = 0.0485$ | $N = 1.51633$ | $V = 64.15$ |
| $r_{12} = \infty$ | | |
| $d_{12} = 0.0202$ | | |
| $r_{13} = 1.1477$ | | |
| $d_{13} = 0.0404$ | $n_6 = 1.72000$ | $\nu_6 = 50.25$ |
| $r_{14} = 0.5962$ | | |
| $d_{14} = 0.4444$ | $n_7 = 1.64769$ | $\nu_7 = 33.80$ |
| $r_{15} = -1.0896$ | | |
| $d_{15} = 0.0808$ | | |
| $r_{16} = -2.1998$ | | |
| $d_{16} = 0.4242$ | $n_8 = 1.72342$ | $\nu_8 = 38.03$ |
| $r_{17} = -0.5297$ | | |
| $d_{17} = 0.0485$ | $n_9 = 1.80518$ | $\nu_9 = 25.43$ |
| $r_{18} = 2.5968$ | | |
| $d_{18} = 0.0404$ | | |
| $r_{19} = -3.0715$ | | |
| $d_{19} = 0.1414$ | $n_{10} = 1.56965$ | $\nu_{10} = 49.33$ |
| $r_{20} = -0.7457$ | | |
| $d_{20} = 0.0048$ | | |
| $r_{21} = -84.7385$ | | |
| $d_{21} = 0.1010$ | $n_{11} = 1.60311$ | $\nu_{11} = 60.70$ |
| $r_{22} = -1.3623$ | | |
| $f_1 = 5.715,$ | $f_4 = 7.172,$ | $f_{12345} = -0.693$ | wherein the reference symbols $r_1$ through $r_{22}$ represent radii of curvature on the surfaces of the respective lens components (and the filter), the reference symbols $d_1$ through $d_{21}$ represent thicknesses of the respective lens components (and the filter) and airspaces therebetween, the reference symbols $n_1$ through $n_{11}$ represent refractive indices of the respective lens components, the reference symbol N represents a refractive index of the filter, the reference symbols $\nu_1$ through $\nu_{11}$ represent Abbe's numbers of the respective lens components, the reference symbol V represents an Abbe's number of the filter, and the reference symbol $\omega$ represents a half field angle of view.

5. A retrofocus type superwide angle lens system according to claim 1 or 2 having the following numerical data:

| $f = 1,$ | F 3.6, | $2\omega = 100°$ |
|---|---|---|
| $r_1 = 2.0309$ | | |
| $d_1 = 0.4525$ | $n_1 = 1.49700$ | $\nu_1 = 81.61$ |
| $r_2 = 4.9920$ | | |
| $d_2 = 0.0048$ | | |
| $r_3 = 1.0695$ | | |
| $d_3 = 0.0606$ | $n_2 = 1.77250$ | $\nu_2 = 49.66$ |
| $r_4 = 0.6630$ | | |
| $d_4 = 0.4525$ | | |
| $r_5 = 2.7516$ | | |
| $d_5 = 0.0485$ | $n_3 = 1.77250$ | $\nu_3 = 49.66$ |
| $r_6 = 0.7021$ | | |
| $d_6 = 0.2141$ | | |
| $r_7 = \infty$ | | |
| $d_7 = 0.0929$ | $n_4 = 1.69350$ | $\nu_4 = 53.23$ |
| $r_8 = -4.5998$ | | |
| $d_8 = 0.0048$ | | |
| $r_9 = 1.0733$ | | |
| $d_9 = 0.0485$ | $n_5 = 1.65830$ | $\nu_5 = 57.33$ |
| $r_{10} = 0.5960$ | | |
| $d_{10} = 0.1616$ | | |
| $r_{11} = \infty$ | | |
| $d_{11} = 0.0485$ | $N = 1.51633$ | $V = 64.15$ |
| $r_{12} = \infty$ | | |
| $d_{12} = 0.0202$ | | |
| $r_{13} = 1.0994$ | | |
| $d_{13} = 0.0404$ | $n_6 = 1.71300$ | $\nu_6 = 53.84$ |
| $r_{14} = 0.5779$ | | |
| $d_{14} = 0.4242$ | $n_7 = 1.64769$ | $\nu_7 = 33.80$ |
| $r_{15} = -1.1319$ | | |
| $d_{15} = 0.0808$ | | |
| $r_{16} = -2.1313$ | | |
| $d_{16} = 0.4242$ | $n_8 = 1.72342$ | $\nu_8 = 38.03$ |
| $r_{17} = -0.5036$ | | |
| $d_{17} = 0.0485$ | $n_9 = 1.80518$ | $\nu_9 = 25.43$ |
| $r_{18} = 2.7547$ | | |
| $d_{18} = 0.0404$ | | |

-continued

| | | |
|---|---|---|
| $r_{19} = -3.1194$ | | |
| $d_{19} = 0.1414$ | $n_{10} = 1.61484$ | $v_{10} = 51.17$ |
| $r_{20} = -0.7700$ | | |
| $d_{20} = 0.0048$ | | |
| $r_{21} = -20.0205$ | | |
| $d_{21} = 0.1091$ | $n_{11} = 1.60738$ | $v_{11} = 56.81$ |
| $r_{22} = -1.3601$ | | |
| $f_1 = 6.557$, | $f_4 = 6.633$, | $f_{12345} = -0.675$ | wherein the reference symbols $r_1$ through $r_{22}$ represent radii of curvature on the surfaces of the respective lens components (and the filter), the reference symbols $d_1$ through $d_{21}$ represent thicknesses of the respective lens components (and the filter) and airspaces therebetween, the reference symbols $n_1$ through $n_{11}$ represent refractive indices of the respective lens components, the reference symbol N represents a refractive index of the filter, the reference symbols $v_1$ through $v_{11}$ represent Abbe's numbers of the respective lens components, the reference symbol V represents an Abbe's number of the filter, and the reference symbol $\omega$ represents a half field angle of view.

6. A retrofocus type superwide angle lens system according to claim 1 or 2 having the following numerical data:

| | | |
|---|---|---|
| $f = 1$, | F 3.6, | $2\omega = 100°$ |
| $r_1 = 2.0440$ | | |
| $d_1 = 0.4525$ | $n_1 = 1.49700$ | $v_1 = 81.61$ |
| $r_2 = 4.9265$ | | |
| $d_2 = 0.0048$ | | |
| $r_3 = 1.0532$ | | |
| $d_3 = 0.0606$ | $n_2 = 1.77250$ | $v_2 = 49.66$ |
| $r_4 = 0.6741$ | | |
| $d_4 = 0.4525$ | | |
| $r_5 = 2.5695$ | | |
| $d_5 = 0.0485$ | $n_3 = 1.77250$ | $v_3 = 49.66$ |
| $r_6 = 0.7388$ | | |
| $d_6 = 0.2141$ | | |
| $r_7 = -63.9498$ | | |
| $d_7 = 0.0929$ | $n_4 = 1.69350$ | $v_4 = 53.23$ |
| $r_8 = -4.5088$ | | |
| $d_8 = 0.0048$ | | |
| $r_9 = 1.0581$ | | |
| $d_9 = 0.0485$ | $n_5 = 1.65830$ | $v_5 = 57.33$ |
| $r_{10} = 0.5869$ | | |
| $d_{10} = 0.2303$ | | |
| $r_{11} = \infty$ | | |
| $d_{11} = 0.0485$ | $N = 1.51633$ | $V = 64.15$ |
| $r_{12} = \infty$ | | |
| $d_{12} = 0.0202$ | | |
| $r_{13} = 1.2239$ | | |
| $d_{13} = 0.0404$ | $n_6 = 1.71300$ | $v_6 = 53.84$ |
| $r_{14} = 0.5775$ | | |
| $d_{14} = 0.4242$ | $n_7 = 1.64769$ | $v_7 = 33.80$ |
| $r_{15} = -1.1416$ | | |
| $d_{15} = 0.0808$ | | |
| $r_{16} = -2.1317$ | | |
| $d_{16} = 0.4242$ | $n_8 = 1.72342$ | $v_8 = 38.03$ |
| $r_{17} = -0.5082$ | | |
| $d_{17} = 0.0485$ | $n_9 = 1.80518$ | $v_9 = 25.43$ |
| $r_{18} = 2.8444$ | | |
| $d_{18} = 0.0404$ | | |
| $r_{19} = -2.8049$ | | |
| $d_{19} = 0.1414$ | $n_{10} = 1.61484$ | $v_{10} = 51.17$ |
| $r_{20} = -0.7913$ | | |
| $d_{20} = 0.0048$ | | |
| $r_{21} = -48.2415$ | | |
| $d_{21} = 0.1091$ | $n_{11} = 1.60738$ | $v_{11} = 56.81$ |
| $r_{22} = -1.3529$ | | |
| $f_1 = 6.681$, | $f_4 = 6.990$, | $f_{12345} = -0.727$ | wherein the reference symbols $r_1$ through $r_{22}$ represent radii of curvature on the surfaces of the respective lens components (and the filter), the reference symbols $d_1$ through $d_{21}$ represent thicknesses of the respective lens components (and the filter) and airspaces therebetween, the reference symbols $n_1$ through $n_{11}$ represent refractive indices of the respective lens components, the reference symbol N represents a refractive index of the filter, the reference symbols $v_1$ through $v_{11}$ represent Abbe's numbers of the respective lens components, the reference symbol V represents an Abbe's number of the filter, and the reference symbol $\omega$ represents a half field angle of view.

7. A retrofocus type superwide angle lens system according to claim 1 or 2 having the following numerical data:

| | | |
|---|---|---|
| $f = 1$, | F 3.6, | $2\omega = 100°$ |
| $r_1 = 2.1468$ | | |
| $d_1 = 0.4525$ | $n_1 = 1.49700$ | $v_1 = 81.61$ |
| $r_2 = 5.2116$ | | |
| $d_2 = 0.0048$ | | |
| $r_3 = 1.1169$ | | |
| $d_3 = 0.0606$ | $n_2 = 1.77250$ | $v_2 = 49.66$ |
| $r_4 = 0.6812$ | | |
| $d_4 = 0.4525$ | | |
| $r_5 = 2.6585$ | | |
| $d_5 = 0.0485$ | $n_3 = 1.77250$ | $v_3 = 49.66$ |
| $r_6 = 0.7222$ | | |
| $d_6 = 0.2141$ | | |
| $r_7 = -135.7023$ | | |
| $d_7 = 0.0929$ | $n_4 = 1.69350$ | $v_4 = 53.23$ |
| $r_8 = -4.2585$ | | |
| $d_8 = 0.0048$ | | |
| $r_9 = 1.0891$ | | |
| $d_9 = 0.0485$ | $n_5 = 1.65830$ | $v_5 = 57.33$ |
| $r_{10} = 0.5965$ | | |
| $d_{10} = 0.1616$ | | |
| $r_{11} = \infty$ | | |
| $d_{11} = 0.0485$ | $N = 1.51633$ | $V = 64.15$ |
| $r_{12} = \infty$ | | |
| $d_{12} = 0.0202$ | | |
| $r_{13} = 1.1589$ | | |
| $d_{13} = 0.0404$ | $n_6 = 1.71300$ | $v_6 = 53.84$ |
| $r_{14} = 0.5855$ | | |
| $d_{14} = 0.4768$ | $n_7 = 1.64769$ | $v_7 = 33.80$ |
| $r_{15} = -1.1048$ | | |
| $d_{15} = 0.0808$ | | |
| $r_{16} = -2.1218$ | | |
| $d_{16} = 0.4242$ | $n_8 = 1.72342$ | $v_8 = 38.03$ |
| $r_{17} = -0.5189$ | | |
| $d_{17} = 0.0485$ | $n_9 = 1.80518$ | $v_9 = 25.43$ |
| $r_{18} = 2.9188$ | | |
| $d_{18} = 0.0404$ | | |
| $r_{19} = -2.8584$ | | |
| $d_{19} = 0.1414$ | $n_{10} = 1.61484$ | $v_{10} = 51.17$ |
| $r_{20} = -0.7817$ | | |
| $d_{20} = 0.0048$ | | |
| $r_{21} = -18.9947$ | | |
| $d_{21} = 0.1091$ | $n_{11} = 1.60738$ | $v_{11} = 56.81$ |
| $r_{22} = -1.3529$ | | |
| $f_1 = 7.002$, | $f_4 = 6.338$, | $f_{12345} = -0.683$ | wherein the reference symbols $r_1$ through $r_{22}$ represent radii of curvature on the surfaces of the respective lens components (and the filter), the reference symbols $d_1$ through $d_{21}$ represent thicknesses of the respective lens components (and the filter) and airspaces therebetween, the reference symbols $n_1$ through $n_{11}$ represent refractive indices of the respective lens components, the reference symbol N represents a refractive index of the filter, the reference symbols $v_1$ through $v_{11}$ represent Abbe's numbers of the respective lens components, the reference symbol V represents an Abbe's number of the filter, and the reference symbol $\omega$ represents a half field angle of view.

* * * * *